United States Patent
Schulte

(10) Patent No.: US 11,246,254 B1
(45) Date of Patent: Feb. 15, 2022

(54) NEGATIVE DOWNFORCE SYSTEM FOR GROUND ENGAGING MACHINERY

(71) Applicant: Parker Hannifin Corporation, Cleveland, OH (US)

(72) Inventor: David C. Schulte, Naperville, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 128 days.

(21) Appl. No.: 16/545,324

(22) Filed: Aug. 20, 2019

Related U.S. Application Data

(60) Provisional application No. 62/721,132, filed on Aug. 22, 2018.

(51) Int. Cl.
| | | |
|---|---|---|
| *A01B 63/114* | (2006.01) | |
| *F15B 9/03* | (2006.01) | |
| *A01B 63/00* | (2006.01) | |
| *F15B 11/028* | (2006.01) | |

(52) U.S. Cl.
CPC .......... *A01B 63/114* (2013.01); *A01B 63/008* (2013.01); *F15B 9/03* (2013.01); *F15B 11/028* (2013.01); *F15B 2211/526* (2013.01); *F15B 2211/7053* (2013.01)

(58) Field of Classification Search
CPC ................ F15B 9/03; F15B 2211/7053; F15B 2211/526; F15B 11/028; A01B 33/087; A01B 79/005
See application file for complete search history.

(56) References Cited

U.S. PATENT DOCUMENTS

| | | | |
|---|---|---|---|
| 8,634,992 B2 | 1/2014 | Sauder | |
| 8,924,102 B2 | 12/2014 | Sauder | |
| 9,144,189 B2* | 9/2015 | Stoller | .................... F15B 15/20 |
| 9,173,339 B2 | 11/2015 | Sauder | |
| 9,288,937 B2 | 3/2016 | Sauder | |
| 9,532,496 B2 | 1/2017 | Sauder | |
| 9,723,776 B2* | 8/2017 | Sporrer | ................ A01B 29/048 |
| 9,746,007 B2 | 8/2017 | Stoller | |
| 9,848,523 B2 | 12/2017 | Sauder | |
| 9,879,702 B2 | 1/2018 | Stoller | |
| 9,955,623 B2 | 5/2018 | Sauder | |
| 10,238,023 B2 | 3/2019 | Sauder | |
| 10,359,062 B2 | 7/2019 | Stoller | |
| 2019/0029165 A1 | 1/2019 | Leimkuehler | |
| 2019/0183036 A1 | 6/2019 | Leimkuehler | |

* cited by examiner

*Primary Examiner* — Michael Leslie
*Assistant Examiner* — Daniel S Collins
(74) *Attorney, Agent, or Firm* — Robert J. Clark

(57) ABSTRACT

A downforce control system for an agricultural ground engaging unit provides individual control of each agricultural ground engaging row unit by providing a proportional pressure control valve connected to the retracting chamber of a double acting cylinder which varies the upward force produced by the retracting chamber of the cylinder against a constant counteracting downward force produced by an extending chamber of the cylinder, the valve control based on a comparison of a sensed resultant downward force on the agricultural ground engaging row unit and a predetermined target downward force.

20 Claims, 3 Drawing Sheets

NEGATIVE DOWNFORCE SYSTEM FOR GROUND ENGAGING MACHINERY

TECHNICAL FIELD

The present disclosure relates generally to agricultural implements and, more particularly, to an agricultural ground engaging unit for use with agricultural implements such as planting row units, seeders, tillage, etc.

BACKGROUND

As an agricultural ground engaging unit travels across fields it is difficult to maintain constant seed depth and other parameters due to changing soil conditions which would ideally require varying the row unit down force pressure.

As computers and GPS systems have allowed crop production to be managed in a location-specific way as an implement moves through the field, it has become necessary to achieve more rapid changes in the setting or adjustment of the implement. In the case of an agricultural ground engaging row unit such as a planter row unit, it is also necessary to generate a large amount of force. Each individual agricultural ground engaging row unit must be able to react to the soil it encounters independently of the other row units. Prior attempts to use individual control valves for multiple agricultural ground engaging row units result in lower precision control. This lower level of control can result in damage to the agricultural ground engaging row units. Therefore, there remains a need for individual control of each agricultural ground engaging row unit.

SUMMARY

At least one embodiment of the invention provides a downforce control system for an agricultural ground engaging unit, comprising: a pressure source; a double acting cylinder having a first chamber and a second chamber, wherein pressure in the first chamber provides a down force and that pressure in the second chamber provides an up force less than and acting against the down force of the first chamber, the double acting cylinder providing a resultant downward force to the agricultural ground engaging unit; a fixed pressure control valve positioned between the pressure source and the first chamber of the double acting cylinder; a proportional pressure control valve positioned between the pressure source and the second chamber of the double acting cylinder; a force feedback sensor mounted on the planter row unit to determine the resultant downward force of the agricultural ground engaging unit; a controller configured to compare the resultant downward force sensed by the force feedback sensor to a predetermined downward force requirement, the controller adapted to control the proportional pressure control valve to increase or reduce the resultant downward force of the agricultural ground engaging unit by increasing or decreasing the pressure in the second chamber of the double acting cylinder.

At least one embodiment of the invention provides a downforce control system for an agricultural ground engaging unit, comprising: a pressure source; a double acting cylinder having a first chamber and a second chamber, the pressure source fluidly connected to the first chamber providing a constant downward force to the agricultural ground engaging unit; a proportional pressure control valve positioned between the pressure source and the second chamber of the double acting cylinder selectively and proportionally connecting the second chamber of the double acting cylinder to the pressure source providing an up force less than and acting against the down force of the first chamber, the double acting cylinder providing a resultant downward force to the agricultural ground engaging unit; a force feedback sensor mounted on the planter row unit to determine the resultant downward force of the agricultural ground engaging unit; a controller configured to compare the resultant downward force sensed by the force feedback sensor to a predetermined downward force requirement, the controller adapted to control the proportional pressure control valve to increase or reduce the resultant downward force of the agricultural ground engaging unit by increasing or decreasing the pressure in the second chamber of the double acting cylinder.

BRIEF DESCRIPTION OF THE DRAWINGS

Embodiments of this invention will now be described in further detail with reference to the accompanying drawing, in which.

DETAILED DESCRIPTION OF THE DRAWING

Figure 1:
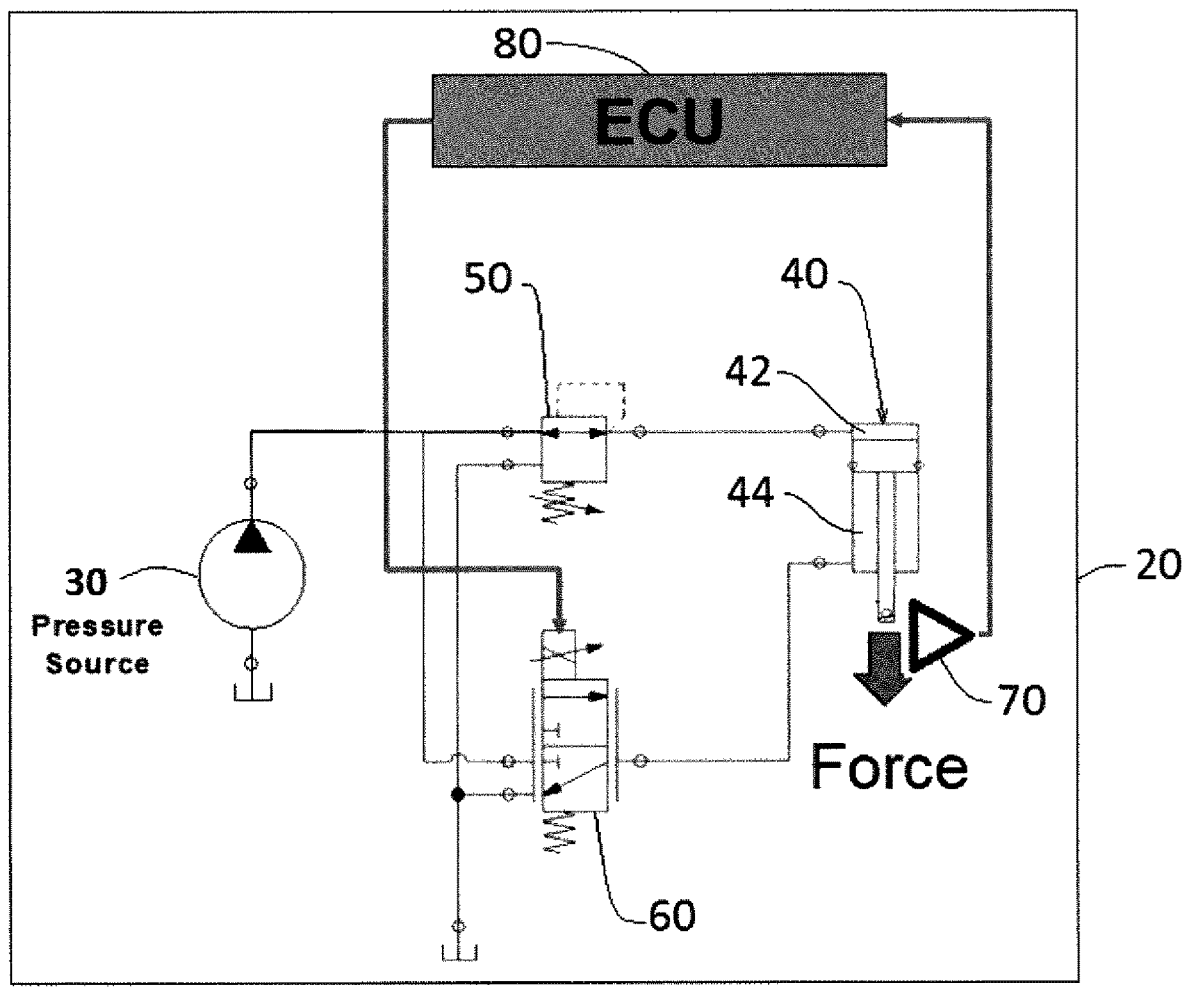
FIG. 1 is a schematic of an embodiment of a downforce control system for an agricultural ground engaging unit.

Referring to FIG. 1, an embodiment of a downforce control system 10 for an agricultural ground engaging unit 20 is shown. The system 10 comprises a pressure source 30 configured to supply pressurized fluid to a double acting cylinder 40 having a first chamber 42 and a second chamber 44. The double acting cylinder 40 is configured to provide a resultant downward force to the agricultural ground engaging unit 20 as discussed below. A fixed pressure control valve 50 is positioned between the pressure source 30 and the first chamber 42 of the double acting cylinder 40 which provides a fixed pressure set to provide a maximum required downforce to the agricultural ground engaging unit 20. A proportional pressure control valve 60 is positioned between the pressure source 30 and the second chamber 44 of the double acting cylinder 40. The pressure in the second chamber 44 of the double acting cylinder 30 provides an upward or up force that is less than and acts against the pressure in the first chamber 42 of the double acting cylinder 40 which results in the resultant downward force of the agricultural ground engaging unit 20. The system 10 further comprises a force feedback sensor 70 mounted on the agricultural ground engaging unit 20 to determine the resultant downward force of the agricultural ground engaging unit 20. Such sensors 70 are well known in the art. The sensor 70 provides downforce information to a logic controller 80 which compares the resultant force from the sensor 70 to a predetermined pressure required at that time. The controller 80 controls the proportional pressure control valve 50 to increase or reduce the resultant downward force of the agricultural ground engaging unit 20 by increasing or decreasing the pressure in the second chamber 44 of the double acting cylinder 40.

The pressure source 30 may be obtained from the tractor valve direct, the vacuum fan, or from a cylinder sized on the maximum available pressure. The system 10 actively controls to a predetermined target force set by the system or operator. The force feedback sensor 70 operates with the controller 80 and valve 60 to ensure that the desired average force is maintained The present invention provides an individual proportional upforce control valve 60 and a fixed pressure down force valve 50 for each row unit 20 which provides a higher level of precision control when compared to prior art systems which use a single valve to control the upforce or downforce of multiple row units.

Figure 2:
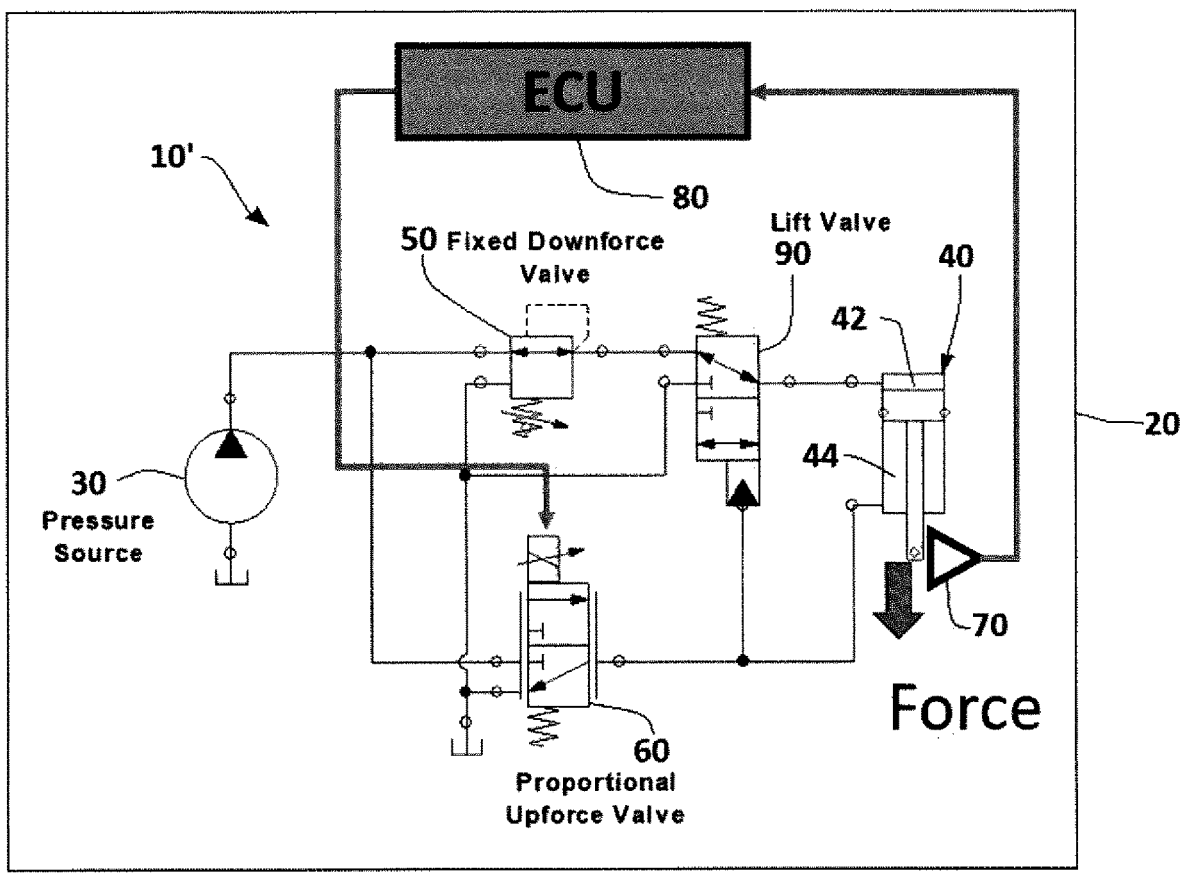
FIG. 2 is a schematic of a second embodiment of a downforce control system for an agricultural ground engaging unit.

Referring to FIG. 2, a second embodiment of a downforce control system 10' for an agricultural ground engaging unit 20 is shown. The system 10' comprises the same elements of system 10 except that it includes a pilot operated directional valve 90 which is used to release hydraulic pressure from the first chamber side 42 of the cylinder 40. The valve 90 will activate when the pressure on the second side 44 of the cylinder 40 reaches a maximum threshold.

Figure 3:
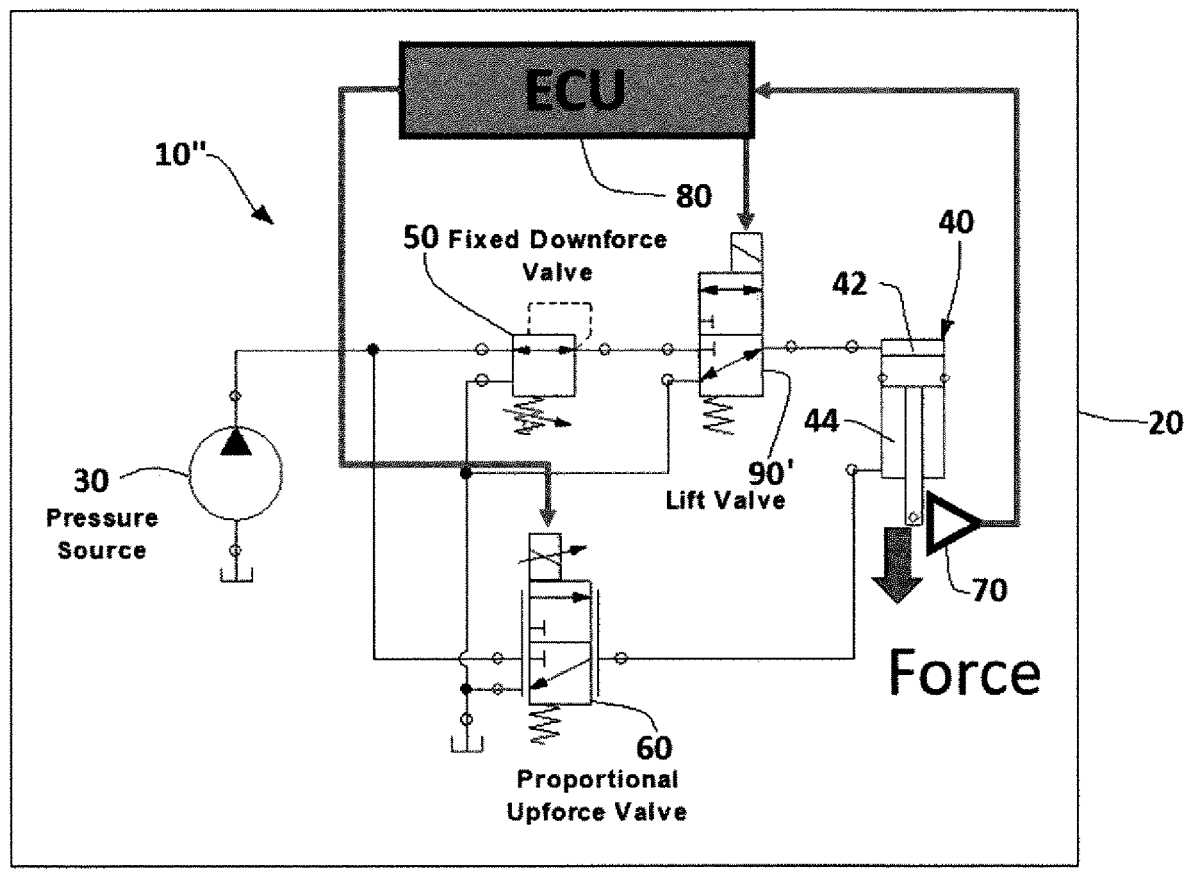
FIG. 3 is a schematic of a third embodiment of a downforce control system for an agricultural ground engaging unit.

Referring to FIG. 3, a third embodiment of a downforce control system 10" for an agricultural ground engaging unit 20 is shown. The system 10" comprises the same elements of system 10' except that it includes an electrically operated directional valve 90' instead of a pilot operated vale 90. Valve 90' will be electrically activated when the pressure on the second side 44 of the cylinder 40 reaches a maximum threshold.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A downforce control system for an agricultural ground engaging unit, comprising:
   a pressure source;
   a double acting cylinder having a first chamber and a second chamber, wherein pressure in the first chamber provides a down force and that pressure in the second chamber provides an up force less than and acting against the down force of the first chamber, the double acting cylinder providing a resultant downward force to the agricultural ground engaging unit;
   a fixed pressure control valve positioned between the pressure source and the first chamber of the double acting cylinder, the fixed pressure control valve configured to maintain a fixed pressure in the first chamber of the double acting cylinder;
   a proportional pressure control valve positioned between the pressure source and the second chamber of the double acting cylinder;
   a force feedback sensor mounted on the planter row unit to determine the resultant downward force of the agricultural ground engaging unit;
   a controller configured to compare the resultant downward force sensed by the force feedback sensor to a predetermined downward force requirement, the controller adapted to control the proportional pressure control valve to increase or reduce the resultant downward force of the agricultural ground engaging unit only by increasing or decreasing the pressure in the second chamber of the double acting cylinder.

2. The system of claim 1, wherein the proportional control valve is an electrically controlled solenoid.

3. The system of claim 1, where in the agricultural ground engaging unit is a single row unit.

4. The system of claim 1, wherein the double acting cylinder is a hydraulic cylinder or a pneumatic cylinder.

5. The system of claim 1 further comprising a directional control valve positioned between the fixed pressure control valve and the first chamber of the double acting cylinder.

6. The system of claim 5, wherein the directional control valve has a first position connecting the fixed pressure control valve to the first chamber side of the cylinder.

7. The system of claim 6, wherein the directional control valve has a second position connecting the first chamber side of the cylinder to a pressure return or sump.

8. The system of claim 7, wherein the directional control valve moves to the second position when the pressure on the second side of the cylinder reaches a maximum threshold.

9. The system of claim 7, wherein the directional control valve is a pilot operated directional control valve wherein the pilot pressure is fluidly connected to the second chamber of the double acting cylinder.

10. The system of claim 7, wherein the directional control valve is an electrically controlled solenoid.

11. A downforce control system for an agricultural ground engaging unit, comprising:
    a pressure source;
    a double acting cylinder having a first chamber and a second chamber, the pressure source fluidly connected to the first chamber providing a constant downward force to the agricultural ground engaging unit;
    a proportional pressure control valve positioned between the pressure source and the second chamber of the double acting cylinder selectively and proportionally connecting the second chamber of the double acting cylinder to the pressure source providing an up force less than and acting against the down force of the first chamber, the double acting cylinder providing a resultant downward force to the agricultural ground engaging unit;
    a force feedback sensor mounted on the planter row unit to determine the resultant downward force of the agricultural ground engaging unit;
    a controller configured to compare the resultant downward force sensed by the force feedback sensor to a predetermined downward force requirement, the controller adapted to control the proportional pressure control valve to increase or reduce the resultant downward force of the agricultural ground engaging unit only by increasing or decreasing the pressure in the second chamber of the double acting cylinder.

12. The system of claim 11 further comprising a fixed pressure control valve positioned between the pressure source and the first chamber of the double acting cylinder.

13. The system of claim 11, wherein the agricultural ground engaging unit is a single row unit.

14. The system of claim 11, wherein the double acting cylinder is a hydraulic cylinder or a pneumatic cylinder.

15. The system of claim 11 further comprising a directional control valve positioned between the fixed pressure control valve and the first chamber of the double acting cylinder.

16. The system of claim 15, wherein the directional control valve has a first position connecting the fixed pressure control valve to the first chamber side of the cylinder.

17. The system of claim 16, wherein the directional control valve has a second position connecting the first chamber side of the cylinder to a pressure return or sump.

18. The system of claim 17, wherein the directional control valve moves to the second position when the pressure on the second side of the cylinder reaches a maximum threshold.

19. The system of claim 17, wherein the directional control valve is a pilot operated directional control valve wherein the pilot pressure is fluidly connected to the second chamber of the double acting cylinder.

20. The system of claim 17, wherein the directional control valve is an electrically controlled solenoid.

* * * * *